United States Patent
Lin et al.

(10) Patent No.: US 9,704,014 B2
(45) Date of Patent: Jul. 11, 2017

(54) PROTECTION CASE FOR ELECTRONIC DEVICE AND FINGERPRINT INPUT METHOD

(71) Applicant: HON HAI PRECISION INDUSTRY CO., LTD., New Taipei (TW)

(72) Inventors: Yi-Cheng Lin, New Taipei (TW); Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/819,614

(22) Filed: Aug. 6, 2015

(65) Prior Publication Data

US 2016/0350579 A1     Dec. 1, 2016

(30) Foreign Application Priority Data

May 28, 2015   (TW) .............................. 104117253 A

(51) Int. Cl.
*G06K 9/00*   (2006.01)
*G06F 21/82*  (2013.01)
*G06F 21/62*  (2013.01)

(52) U.S. Cl.
CPC ..... *G06K 9/00033* (2013.01); *G06F 21/6218* (2013.01); *G06F 21/82* (2013.01)

(58) Field of Classification Search
CPC . G06F 21/82; G06F 21/6218; G06K 9/00033; G06K 9/00261

USPC .......................................... 382/115, 124, 313
See application file for complete search history.

(56) References Cited

U.S. PATENT DOCUMENTS

| | | | | |
|---|---|---|---|---|
| 7,787,666 B2* | 8/2010 | Paloniemi | ........... | G06F 3/03547 340/5.83 |
| 2011/0287726 A1* | 11/2011 | Huang | ................. | H04B 1/3883 455/90.3 |
| 2014/0190814 A1* | 7/2014 | Wu | ........................... | G06F 1/16 200/600 |
| 2014/0230047 A1* | 8/2014 | Scully-Power | ......... | G06F 21/32 726/19 |
| 2014/0262848 A1* | 9/2014 | Fathollahi | ............... | A45C 11/00 206/37 |
| 2014/0268519 A1* | 9/2014 | Huang | ................. | H04B 1/3888 361/679.01 |
| 2015/0278577 A1* | 10/2015 | Cho | ........................ | G06F 3/041 382/124 |

\* cited by examiner

*Primary Examiner* — Daniel Mariam
(74) *Attorney, Agent, or Firm* — Steven Reiss

(57) ABSTRACT

A protection case for receiving an electronic device includes a fingerprint reader, a communication unit, and a processor. The fingerprint reader reads a fingerprint of a finger placed on the fingerprint reader and transmits fingerprint data to the processor. The processor determines a movement path of the fingerprint placed on the fingerprint reader according to successively read fingerprint data, and transmits the determined movement path to the electronic device received in the protection case via the communication unit, to instruct the electronic device to perform a corresponding function.

2 Claims, 5 Drawing Sheets

PROTECTION CASE FOR ELECTRONIC DEVICE AND FINGERPRINT INPUT METHOD

FIELD

The subject matter relates to accessories for electronic devices, and more particularly, to a protection case for an electronic device and a fingerprint input method applied to the protection case.

BACKGROUND

Electronic devices are generally enclosed in protection cases to prevent scratching. The protection case can cover just one surface of the device. In other implementations the protection case can have access ports formed to allow for connecting devices to work with the electronic device.

BRIEF DESCRIPTION OF THE DRAWINGS

Implementations of the present technology will now be described, by way of example only, with reference to the attached figures.

DETAILED DESCRIPTION

Figure 1:
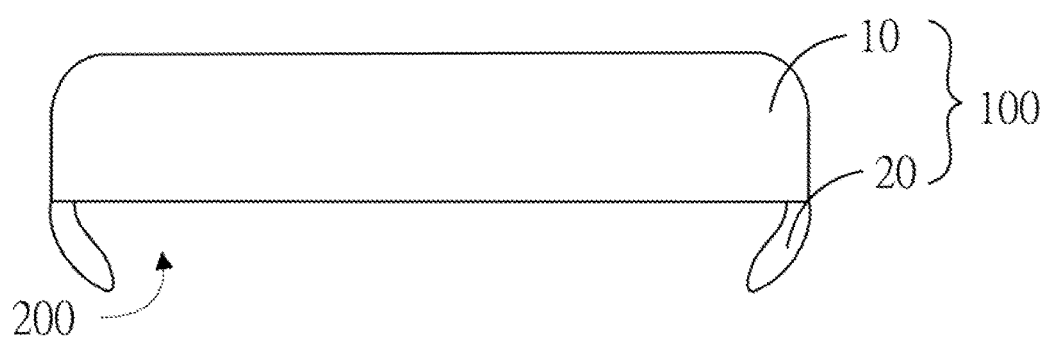
FIG. 1 is a diagrammatic view of an embodiment of a protection case for an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates a protection case 100 for receiving an electronic device. The protection case 100 includes a covering body 10 and a number of sidewalls 20 extending from edges of the covering body 10. The covering body 10 and the sidewalls 20 cooperatively define a receiving space 200 for receiving the electronic device. In this embodiment, the covering body 10 is substantially rectangular in shape, and is made of an elastic material (such as rubber) which can absorb an impact when the electronic device is dropped. The electronic device may be a cell phone, a tablet computer, a multimedia player, or other portable electronic devices.

Figure 2:
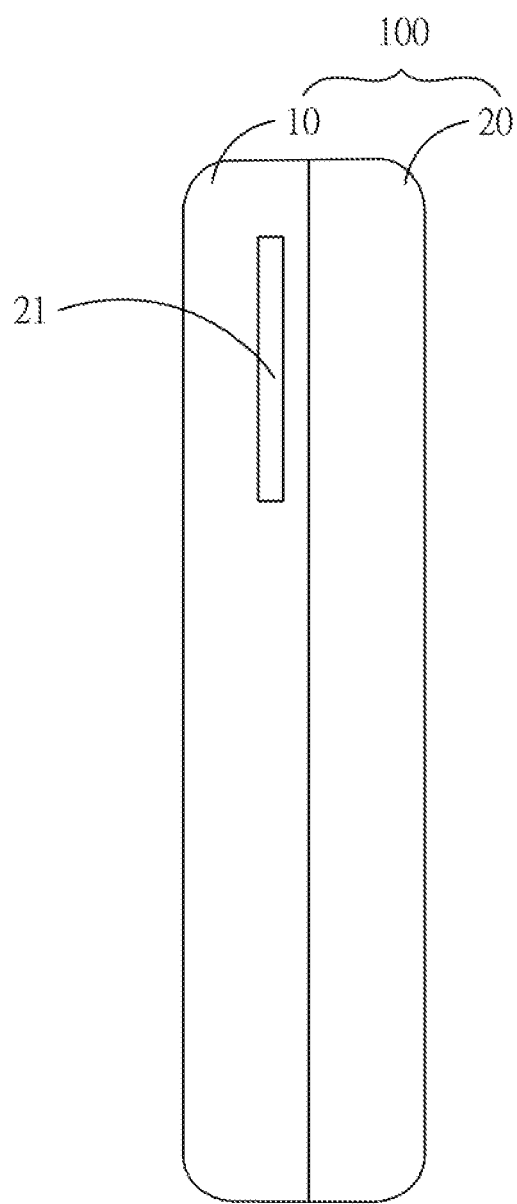
FIG. 2 is similar to FIG. 1, but showing a side view of the protection case.
Figure 3:
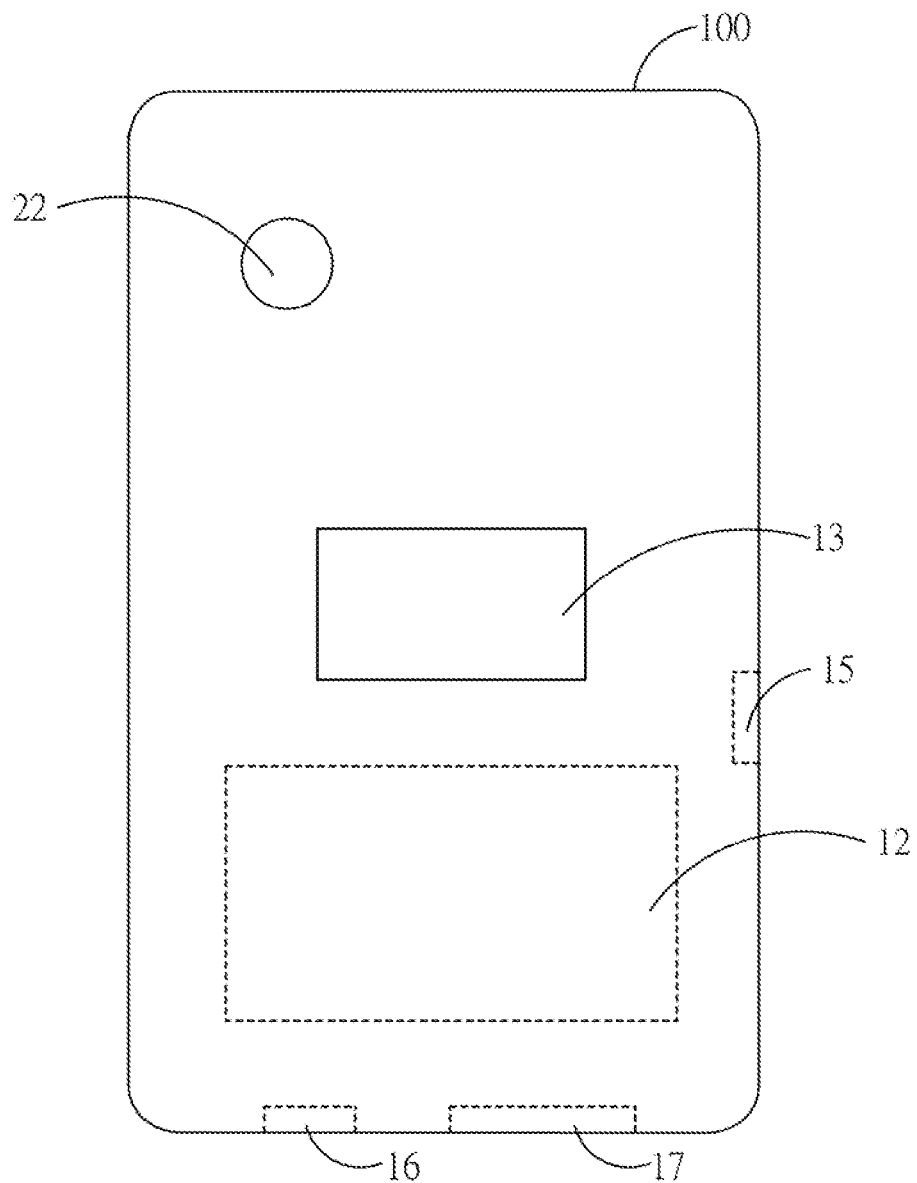
FIG. 3 is similar to FIG. 1, but showing a back view of the protection case.

FIG. 2 illustrates that at least one opening 21 is defined in one sidewall 20 of the protection case 100. Each opening 21 faces one button (not shown) of the electronic device when the electronic device is received in the protection case 100, thereby allowing the button to be operated by a user via the opening 21. The covering body 10 includes a back surface (not shown) surrounded by the edges from which the sidewalls 20 are extended. FIG. 3 illustrates that at least one camera aperture 22 is defined in the back surface of the covering body 10. Each camera aperture 22 faces one rear camera (not shown) of the electronic device when the electronic device is received in the protection case 100, thereby allowing the rear camera to capture images via the camera aperture 22.

The protection case 100 further includes a fingerprint reader 13, a processor 11 (shown in FIG. 4), and a communication unit 17 located in the covering body 10.

The fingerprint reader 13 reads a fingerprint placed on the fingerprint reader 13 to obtain fingerprint data. In this embodiment, the fingerprint reader 13 is located in the back surface of the covering body 10.

The processor 11 determines a movement path of the fingerprint placed on the fingerprint reader 13 according to successively read fingerprint data, and transmits the determined movement path to the electronic device received in the protection case 100 via the communication unit 17, to instruct the electronic device to perform a corresponding function, such as moving a cursor on the screen. That is, the fingerprint reader 13 can serve as a touch screen of the electronic device. The control unit 11 can be a microcontroller unit (MCU), a central process unit (CPU), or a controlling integrated circuit (IC) chip.

The processor 11 further generates an operation signal in response to the fingerprint data read by the fingerprint reader 13, and transmits the operation signal to the electronic device received in the protection case 100 via the communication unit 17, to instruct the electronic device to perform a corresponding function. In at least one embodiment, the operation signal is an unlock signal which instructs the electronic device to unlock a screen (not shown). In another embodiment, the operation signal is an encrypting signal including the fingerprint data which instructs the electronic device to encrypt a file using the fingerprint data. As such, a user needs to initiate an authentication process (that is, the fingerprint authentication by the fingerprint reader 13) if the user wants to open the encrypted file.

In at least one embodiment, the communication unit 17 is a data communication unit such as a micro USB unit or a mini USB unit. The communication unit 17 is connected to a data communication unit (not shown) of the electronic device received in the protection case 100 for transmitting data between the electronic device and the protection case 100.

Figure 4:
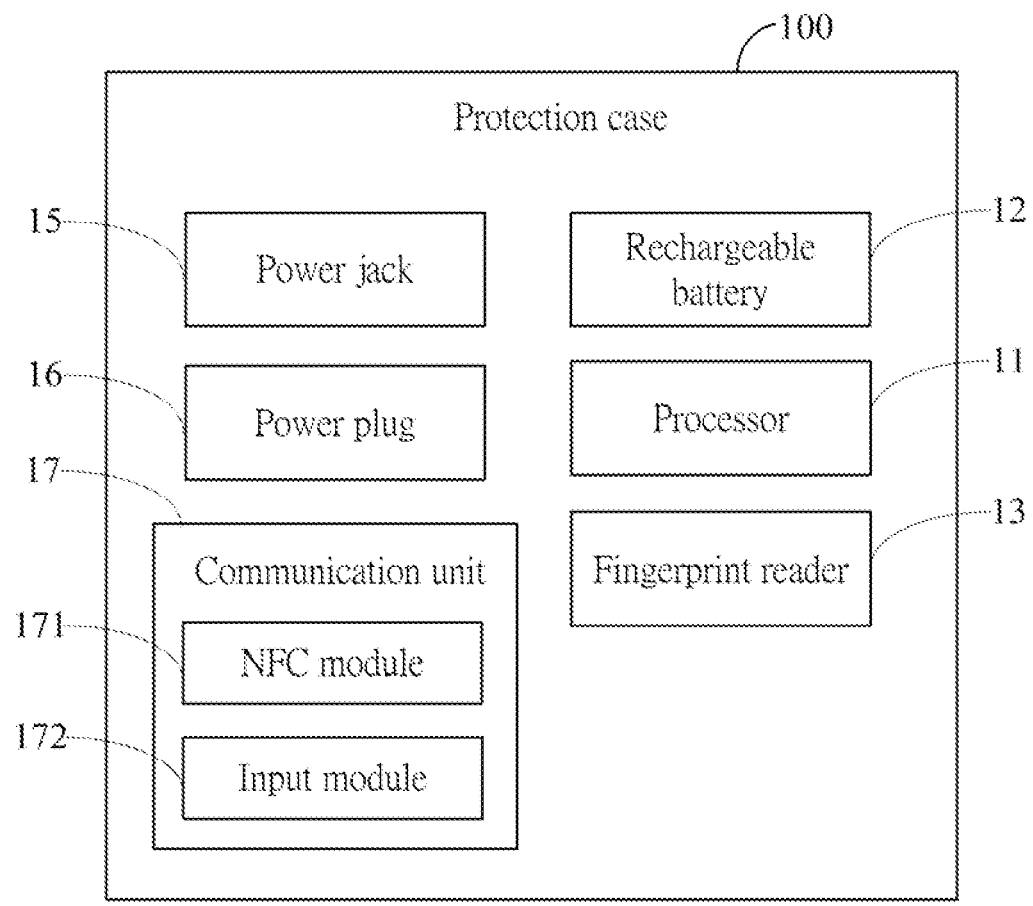
FIG. 4 is a block diagram of the protection case of FIG. 1.

FIG. 4 illustrates that in another embodiment, the communication unit 17 is a near field communication (NFC) unit. In this embodiment, the NFC unit includes a NFC module 171 and an input module 172. A NFC device (not shown) can communicate with the protection case 100 via the NFC module 171. The NFC device can be the electronic device received in the protection case 100. In another embodiment, the NFC device can be another device having a NFC function. As such, if the user loses the electronic device and the protection case 100, another device having a NFC function can be used to establish a communication connection between the device and the protection case 100 when the device moves within the near field of the protection case 100, and which may help to find the protection case 100.

The input module 172 receives input operations of the user and generates input signals accordingly. The NFC module 171 transmits the input signals to the electronic device received in the protection case 100, to instruct the electronic device to perform a corresponding function. As such, if the user is not allowed to use the touch screen of the electronic device in some occasions (for example, in a meeting), the user can operate the protection case 100 to control the electronic device via the NFC unit.

In at least one embodiment, the protection case 100 can further include a rechargeable battery 12, a power jack 15, and a power plug 16 located in the covering body 10. The processor 11 and the fingerprint reader 13 can be integrated on a printed circuit board (PCB), not shown.

The rechargeable battery 12 applies electrical power to the processor 11, the fingerprint reader 13, the communication unit 17, the power jack 15, and the power plug 16.

The power jack 15 is electrically connected to a peripheral device (for example, a portable power source, a power adapter, or other power sources). The rechargeable battery 12 can be charged via the power jack 15. The power jack 15 can be a USB power jack or a wireless power jack.

The power plug 16 is electrically connected to one or more batteries (not shown) of the electronic device received in the protection case 100 to charge the one or more batteries of the electronic device. In another embodiment, the communication unit 17 and the power plug 16 can be integrated into one unit.

Figure 5:
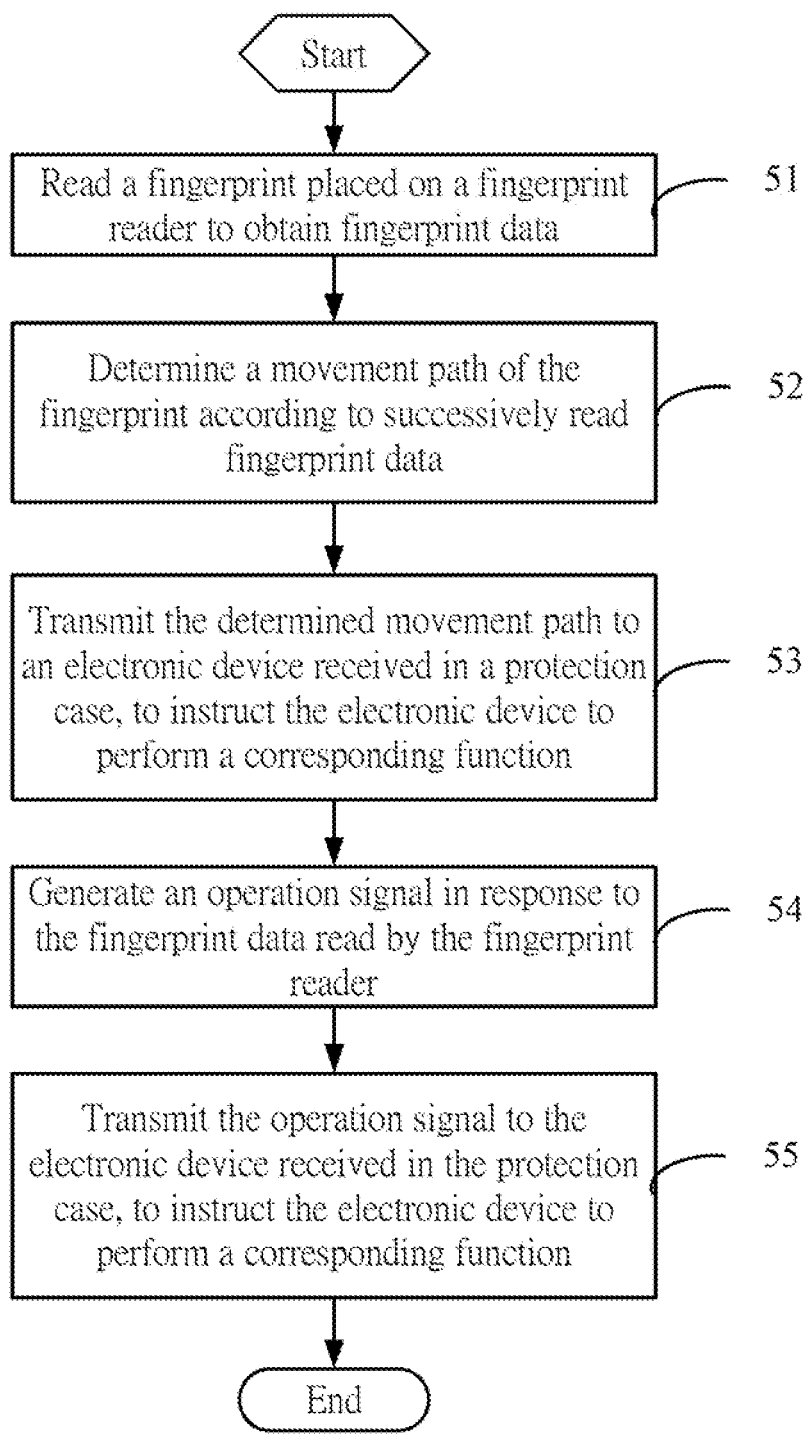
FIG. 5 is a flowchart of an embodiment of a fingerprint input method.

FIG. 5 illustrates a flowchart of a fingerprint input method in accordance with an example embodiment. The method is provided by way of example, as there are a variety of ways to carry out the method. The method described below can be carried out using the configurations illustrated in FIGS. 1-4, for example, and various elements of these figures are referenced in explaining example method. Each block shown in FIG. 5 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 51.

At block 51, a fingerprint reader reads a fingerprint placed on the fingerprint reader to obtain fingerprint data. In this embodiment, the fingerprint reader is located in a back surface of a covering body of the protection case.

At block 52, a processor determines a movement path of the fingerprint placed on the fingerprint reader according to successively read fingerprint data.

At block 53, the processor transmits the determined movement path to the electronic device received in the protection case via the communication unit, to instruct the electronic device to perform a corresponding function.

At block 54, the processor further generates an operation signal in response to the fingerprint data read by the fingerprint reader.

At block 55, the processor transmits the operation signal to the electronic device received in the protection case via the communication unit, to instruct the electronic device to perform a corresponding function. In at least one embodiment, the operation signal is an unlock signal which instructs the electronic device to unlock a screen. In another embodiment, the operation signal is an encrypting signal including the fingerprint data which instructs the electronic device to encrypt a file using the fingerprint data. In at least one embodiment, the communication unit is a data communication unit such as a micro USB unit or a mini USB unit.

The embodiments shown and described above are only examples. Many details are often found in the art such as the other features of a protection case. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A protection case for receiving an electronic device having a screen, the protection case comprising:
   a communication unit configured to transmit data to the electronic device;
   a processor coupled to the communication unit;
   a fingerprint reader configured to read a fingerprint of a finger placed on the fingerprint reader and configured to transmit fingerprint data to the processor; and
   wherein the processor configured to:
      determine a movement path of the fingerprint placed on the fingerprint reader according to successively read fingerprint data; and
      transmit, via the communication unit, the determined movement path to the electronic device received in the protection case to instruct the electronic device to move a cursor on the screen accordingly;
      generate an operation signal in response to the fingerprint data read by the fingerprint reader, and transmit the operation signal to the electronic device received in the protection case via the communication unit, to instruct the electronic device to perform a corresponding function, wherein the operation signal is an encrypting signal comprising the fingerprint data which instructs the electronic device to encrypt a file using the fingerprint data.

2. A fingerprint input method applied in a protection case for receiving an electronic device having a screen, the fingerprint input method comprising:
   reading a fingerprint of a finger placed on a fingerprint reader of the protection case;
   determining a movement path of the fingerprint placed on the fingerprint reader according to successively read fingerprint data; and
   transmitting the determined movement path to the electronic device received in the protection case, to instruct the electronic device to move a cursor on the screen accordingly;
   generating an operation signal in response to the fingerprint data read by the fingerprint reader;
   transmitting the operation signal to the electronic device received in the protection case, to instruct the electronic device to perform a corresponding function, wherein the operation signal is an encrypting signal comprising the fingerprint data which instructs the electronic device to encrypt a file using the fingerprint data.

* * * * *